United States Patent [19]

Torline et al.

[11] Patent Number: 5,227,071
[45] Date of Patent: Jul. 13, 1993

[54] METHOD AND APPARATUS FOR PROCESSING OILY WASTEWATER

[75] Inventors: William N. Torline, Hanover; Richard K. Williams, Madison, both of Ind.

[73] Assignee: Madison Chemical Company, Inc., Madison, Ind.

[21] Appl. No.: 822,144

[22] Filed: Jan. 17, 1992

[51] Int. Cl.$^5$ .............................................. B01D 61/20
[52] U.S. Cl. ..................................... 210/651; 210/671; 210/693; 210/694; 210/708; 210/804; 210/805; 210/806; 210/807; 210/195.2; 210/198.1; 210/257.2; 210/260
[58] Field of Search ................... 210/321.69, 634, 637, 210/641, 644, 649–654, 767, 639, 660, 661, 671, 693, 691, 692, 694, 708, 724, 743, 800, 804, 805–808, 195.1, 195.2, 194, 198.1, 200, 201, 202, 252, 257.2, 259–262, 294, 295, 321.6, 322, 263–265, 513

[56] References Cited

U.S. PATENT DOCUMENTS 4,846,976 7/1989 Ford .............................. 210/321.69

Primary Examiner—Frank Sever
Attorney, Agent, or Firm—Foley & Lardner

[57] ABSTRACT

A five stage treatment system for treating oily wastewater to fit it for discharge to surface waters comprising a coalescer for separating free oil, an ultrafiltration unit for separating emulsified oil, an activated carbon filter for separating residual light organic compounds, a cation exchanger for removing heavy metal ions, a pH adjusting unit for adjusting the treated water to substantially neutral pH prior to discharge, and a controller for regulating the operation of the system. An optional gravity separation stage and/or a clarifier stage may also be included, if desired. Flow of permeate from the ultrafiltration stage is monitored and control valves admitting feed solution to the ultrafiltration unit or discharging retentate from the ultrafiltration unit are adjusted in response to the measured values to maintain a desired rate of permeate flow.

36 Claims, 1 Drawing Sheet

METHOD AND APPARATUS FOR PROCESSING OILY WASTEWATER

BACKGROUND OF THE INVENTION

The present invention relates to a method and apparatus for processing oily wastewaters, such as bilge water from ships, boats and the like.

Numerous processes and activities produce wastewater which is contaminated with oil. For example, the bilge water which leaks into ships or boats frequently becomes contaminated with oil leaked or spilled from machinery or tanks on the vessels. Many industrial processes, such as machining of metal, also produce wastewater contaminated with oil.

Current environmental laws encourage both waste minimization and resource recovery while current economic conditions require them. The rapid consumption of inherently limited petroleum deposits by modern industrial societies makes it economically desirable to recover and reuse oil. Ecological considerations also have led governments to promulgate environmental regulations which prohibit disposing of oily wastes in such a way as to contaminate the environment. Yet currently available technologies for recovery or disposal tend to be expensive or less than fully effective. Thus, while both economic and environmental considerations make it desirable to recover oil from wastewater, considerable difficulty may be encountered in attempting to separate and recover oil from oily wastewaters.

Oily wastewaters generally contain oil in two forms. The first is free oil which is simply intermixed with the aqueous phase. The second form is emulsified oil in which tiny particles of oil are stably dispersed throughout the aqueous phase. Although oil and water are generally immiscible, it is often costly and time consuming to separate them, and in some cases it is so difficult as to be considered impractical. The difficulties are compounded when the proportion of oil in a wastewater is small, e.g., less than about 10 percent. Despite the great deal of effort which has been expended in this field, there remains a need for improved methods and apparatus for treating oily wastewater to separate the oil from the water.

SUMMARY OF THE INVENTION

It is an object of the present invention to provide an improved method and apparatus for treating oily wastewater.

Another object of the invention is to provide a method and apparatus which can recover the value of oil contaminants in wastewaters.

A further object of the invention is to provide a method and apparatus for treating oily wastewater which can minimize environmental contamination and reduce the load on wastewater treatment systems.

It is also an object of the present invention to provide a method and apparatus for treating oily wastewater which can effectively process water containing small quantities of oil.

Yet another object of the invention is to provide a method and apparatus for treating oily wastewater which is economically viable.

A still further object of the invention is to provide a method and apparatus for treating oily wastewater which can recover even emulsified oil.

An additional object of the invention is to provide a method and apparatus which is especially adapted for treating bilge water from ships, boats and the like.

These and other objects of the invention are achieved by providing a method of treating oily wastewater comprising the steps of passing oily wastewater through a coalescer to coalesce dispersed oil droplets; separating a free oil fraction as a liquid stream having a lower specific gravity from a contaminated water stream having a higher specific gravity; filtering particulate material from said contaminated water stream; passing the filtered water stream under pressure across an ultrafiltration membrane to separate a retentate fraction enriched in residual emulsified oil from an aqueous permeate fraction; recycling said retentate fraction to said coalescer; filtering said aqueous permeate through an activated carbon filter to remove low molecular weight organic materials; subjecting the filtrate from said activated carbon filter to cation exchange to remove heavy metal ions; and periodically flushing said ultrafiltration membrane with filtrate from said particulate filter to maintain the permeability of said ultrafiltration membrane.

In accordance with a further aspect of the invention, the objects are achieved by providing an apparatus for treating oily wastewater comprising means for feeding wastewater; a coalescer for separating a free oil fraction as a light stream from a contaminated water heavy stream; an oil fraction discharge means communicating with an upper portion of said coalescer, a solids filter, an ultrafiltration unit; means for conveying said contaminated water heavy fraction from said coalescer through said solids filter to said ultrafiltration unit; a retentate line leading from a retentate chamber of said ultrafiltration unit back to said coalescer; an activated carbon filter; a permeate line leading from a permeate chamber of said ultrafiltration unit to said carbon filter; a cation exchanger; a supply line leading from an outlet of said carbon filter to said ion exchanger; pump means for conveying oily wastewater through said apparatus, a flush discharge line connected to said retentate chamber of said ultrafiltration unit; valve means for controlling access of retentate from said retentate chamber to said flush discharge line, and a controller for periodically opening said flush valves.

According to a further aspect of the invention, an apparatus is provided which comprises a flow sensor for measuring the flow of contaminated water through said ultrafiltration unit; control valve means for regulating the flow of contaminated water through said ultrafiltration unit, and a controller responsive to said flow sensor to adjust said control valve means in order to regulate the flow of contaminated water through said ultrafilter.

BRIEF DESCRIPTION OF THE DRAWINGS

The invention will be described in further detail with reference to the accompanying drawings in which.

DETAILED DESCRIPTION OF THE PREFERRED EMBODIMENTS

Figure 1:
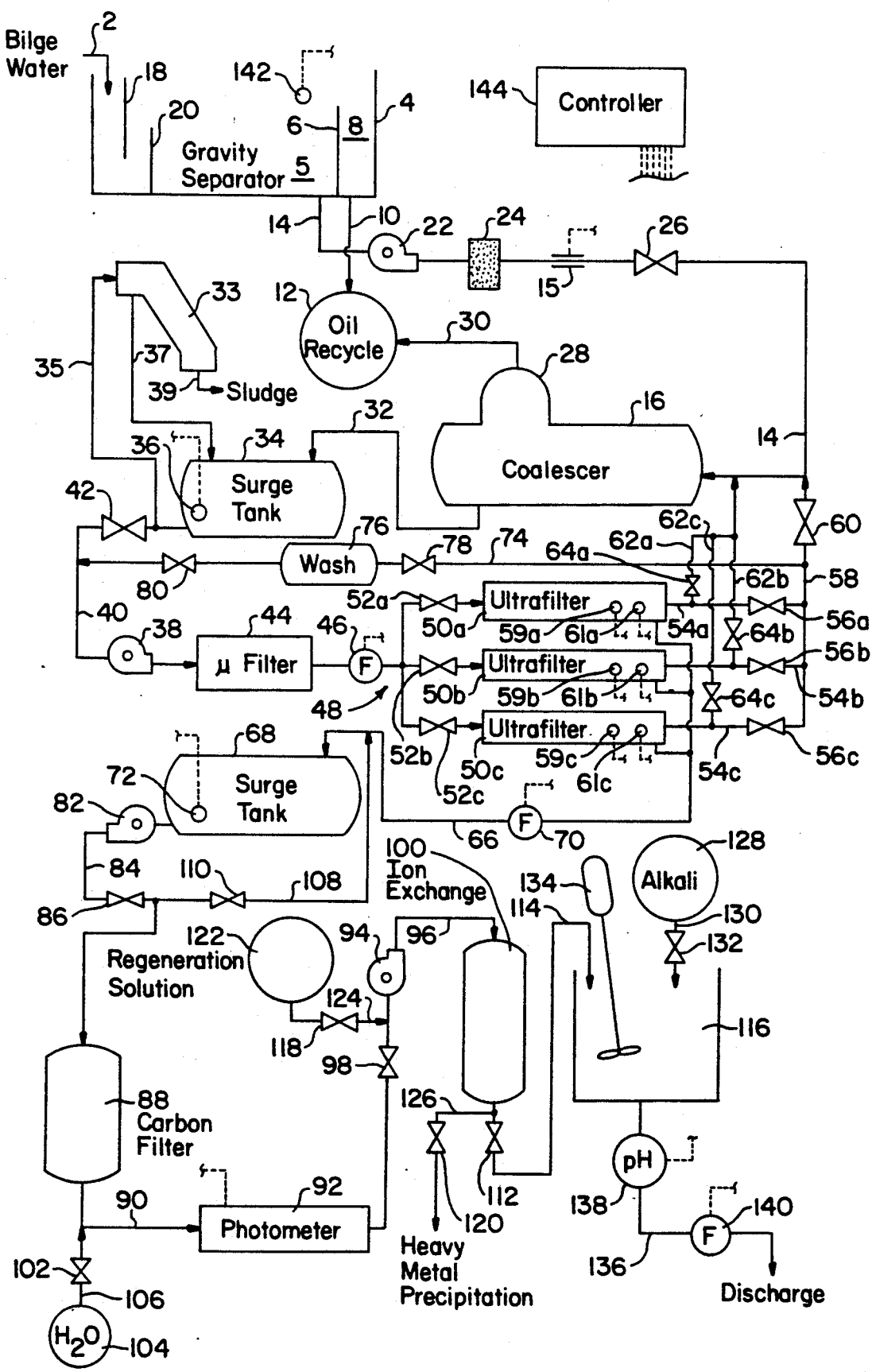
FIG. 1 is a schematic representation of an apparatus according to the invention adapted to carry out the process of the invention.

The invention will be described in further detail with reference to an illustrative preferred embodiment for treating oily bilge water from river towboats to recover the oil and produce a clean water fraction which can be safely discharged into a river or stream or into a municipal sewage treatment system. It is understood, however, that the method and apparatus of the invention are equally applicable to other types of oily wastewater.

Bilge water is introduced through a line 2 into a gravity separator 4 in which a lighter fraction of free oil is allowed to float to the surface of the liquid. The lighter oil fraction, which has a specific gravity lower than that of the heavier aqueous fraction, flows from the top of the liquid over an outlet baffle 6 to an oil discharge chamber 8 from which it is conveyed through line 10 to a conventional oil recovery installation 12. A heavier aqueous fraction, which has a specific gravity higher than that of the lighter free oil fraction and contains traces of dispersed free oil and emulsified oil, is discharged from the bottom of gravity separator 4 through line 14 to a coalescer 16. Inlet baffles 18 and 20 are provided in gravity separator 4 to prevent incoming bilge water from flowing directly from inlet line 2 to outlet line 14 before there is sufficient opportunity for separation of free oil to occur. One or more liquid level sensors 142 may be provided in gravity separator 4 to detect the oil level and regulate the introduction of bilge water to the separator in such a way that the liquid level is prevented from either exceeding, or falling below, desired levels required for effective operation of the separator. The liquid level sensor 142 has the ability to detect the liquid interface between the oil and water phases due to their different specific gravities. Suitable units are known in the art and are commercially available from a number of sources. For example, a suitable snap acting automatic level control is available from Linc Mfg. of Porter, Tex. under the model designation "Linc 282". In particular, the level sensor prevents aqueous material from passing over outlet baffle 6 into oil discharge chamber 8.

The use of a gravity separator is optional. Gravity separation is particularly desirable when the oily wastewater contains especially large amounts of free oil, and it is unnecessary if the oily wastewater contains only small amounts of free oil, e.g., less than about 10%.

An external detector 15 may be provided on line 14 to detect feed streams containing 97% or more oil. Capacitance, inductance or other suitable types of detectors may be employed. High oil content streams are suitable for direct oil recovery and can be diverted directly to the oil recovery system without treatment by the method and apparatus of the invention.

A pump 22 is provided on line 14 to convey the oil-contaminated aqueous fraction through the line. A filter 24 is interposed in line 14 to remove solids which otherwise could impede flow through the subsequent coalescer 16. A flow regulating valve 26 is also provided on line 14 to regulate the flow through line 14 to coalescer 16.

Coalescence is a static process that separates oil and water mixtures based on immiscibility and specific gravity differential, assisted by a contact media that enhances the formation of oil droplets large enough to rapidly separate from the aqueous phase. Oil-in-water emulsions present in the process stream may also break down at least partially in the coalescer. There are no moving parts in the coalescer other than the feed pump. The coalescer produces a substantially water-free oil stream, and an aqueous wastewater stream which still contains emulsified oil.

The coalescer removes the largest part, in many cases greater than 99%, of the free oil in the oily wastewater. The coalescer contains a contact medium which brings dispersed oil droplets together to form larger drops and makes use of Stokes' law $$V = [K(S_w - S_o)d^2]/2$$

where V represents the terminal velocity of the fluid, $S_2$ represents the specific gravity of water, $S_o$ represents the specific gravity of the contaminating oil, d represents the droplet diameter, and K is a constant. The coalescer takes advantage of the known principle that when two immiscible fluids, such as oil and water, are mixed, the lighter fluid rises while the heavier fluid falls. The force by which the oil droplet accelerates to the surface is known as the buoyancy force and is opposed by the drag force of the surrounding fluid. According to Stokes' law, the terminal velocity of a rising oil droplet is proportional to the cross-sectional area of the droplet. The smaller the droplet size, the larger the ratio of the drag force to the buoyancy force, and the slower the oil separates from the water. The coalescer promotes the aggregation of smaller droplets together to form larger drops. As a result these drops of free oil rise to the surface faster, and a layer of free oil accumulates at the top of the coalescer.

The free oil collects in a collection boot 28 at the top of the coalescer, from where it is withdrawn through a line 30 to the oil recovery system 12. In the recovery system, the collected free oil can be processed for reuse, e.g., as a fuel oil for tow boats.

The heavy stream from the coalescer is withdrawn from the bottom of the coalescer through line 32. This stream contains water contaminated with emulsified oil, together with low molecular weight organic compounds, metal ions and minute solids. This stream is conveyed through line 32 to a surge tank 34 which serves to compensate for any variations in the flow from the coalescer and maintain a steady supply of contaminated water for subsequent treatment stages. A level controller 36 is provided in surge tank 34 to maintain a proper liquid level in the tank. The level controller 36 acts to shut down the system if the water in the surge tank falls below a desired level and prevents the subsequent pump 38 from being run dry.

If desired, particularly in cases where the water to be treated contains significant amounts of solids, the wastewater stream may be passed through a clarifier before being subjected to subsequent ultrafiltration. In an illustrative arrangement, liquid from surge tank 34 may be withdrawn to a clarifier 33 via line 35 in order to control the solids content in the feed to the ultrafiltration unit. Clarified liquid is returned to surge tank 34 via line 37, while solids separated from the liquid are discharged in the form of a sludge through line 39.

From surge tank 34, the oil-contaminated water is pumped by pump 38 through line 40 and valve 42 to a micron filter 44, where minute solids which could interfere with subsequent ultrafiltration, are removed. The micron filter 44 is necessary to keep the solids level in the feed stream down and also to protect the ultrafiltration membranes of the ultrafiltration unit from possible tears and abrasions. If a large particle gets into the ultrafiltration cartridge, the membrane can actually be torn, leading to direct mixing of the emulsified oil feed stream with the permeate stream. After passing through a flow meter 46, the filtrate from micron filter 44 is introduced into an ultrafiltration unit 48.

In the method and apparatus of the invention, emulsified oil is separated from the wastewater stream by ultrafiltration, which is defined as the filtration of ultrafine particles, typically between 0.01 and 0.001 microns in size. Ultrafiltration is a pressure driven membrane fractionation process that is used to separate and concentrate macromolecules and colloids from water and wastewater streams. Ultrafiltration uses a membrane which is characterized to pass water and smaller inorganic molecules while rejecting larger organic molecules. When an emulsified water stream runs through the ultrafiltration unit, water permeates through the ultrafiltration membrane, while larger oil molecules do not. The retained portion of the feed stream, or retentate, flows across the ultrafiltration membrane and then is returned to the coalescing unit for further removal of oil which has broken free from the emulsion during the ultrafiltration. The process is continued until all water has been treated or until permeate flow decreases to a point where cleaning of the membranes is required. Two process streams exit the ultrafiltration unit. The first is a clarified water permeate with trace amounts of low molecular weight organic compounds and water-soluble inorganic compounds. The second is a concentrated stream containing the emulsified oil particles of higher molecular weight.

As used herein, the term "low molecular weight organic compound" refers to an organic compound which is sufficiently small to pass through the membranes of the ultrafiltration unit. The unit used in the preferred embodiment of the invention is nominally rated to pass compounds having molecular weights of 15,000 dalton or less. As a practical matter, the low molecular weight organic compounds passed by the ultrafiltration unit will have molecular weights of less than about 5,000, generally less than 3,000, and typically less than about 2,000.

In the preferred embodiment, ultrafiltration unit 48 is made up of spirally wound ultrafiltration cartridges 50a, b, c, in which a four-layer composite of a permeate carrier mesh, a first ultrafiltration membrane, a feed or retentate carrier mesh, and a second ultrafiltration membrane, is spirally wound around a central discharge line. The central discharge line is provided with radial orifices which communicate with the permeate chamber formed by the permeate carrier mesh. Successive layers of the composite are wrapped over each other so that the permeate carrier mesh layer of a successive wrap rests on top of the second ultrafiltration membrane layer of a preceding wrap. The axial ends of the permeate carrier mesh layers are sealed so that permeate liquid can exit only through the radial passageways into the central discharge line. Feed water contaminated with emulsified oil is introduced under pressure through one axial end of the feed carrier mesh layer, passes axially through the feed chamber defined by the feed carrier mesh layer, and is withdrawn as retentate through the other axial end of the feed carrier mesh layer.

As previously noted, the ultrafiltration membranes are permeable to small molecules, such as water molecules, but impermeable to large molecules, such as oil molecules. Due to the pressure in the feed chamber, small molecules are forced through the ultrafiltration membrane into the permeate chamber defined by the permeate carrier mesh layer as an oil-free permeate, which moves through the feed carrier mesh layer to the radial passageways communicating with the discharge line and into the discharge line. As water molecules pass through the ultrafiltration membranes into the permeate chamber, the remaining oil-in-water emulsion in the feed chamber becomes enriched in oil, thereby inducing at least partial breaking of the emulsion and releasing some of the hitherto emulsified oil as free oil in the retentate liquid. The retentate is withdrawn through the other axial end of the feed carrier mesh layer and conveyed back to the coalescer.

Ultrafiltration unit 48 comprises a plurality of individual ultrafiltration cartridges 50a, 50b, 50c arranged in parallel. For convenience in illustration, only three ultrafiltration cartridges are shown, but it will be appreciated that any desired number could be used. In test installations, good results have been achieved with ultrafiltration units consisting of six or seven parallel ultrafiltration cartridges. Each ultrafiltration cartridge 50a, b or c is preceded by an inlet control valve 52a, b or c, respectively, which controls the flow of feed liquid into the retentate chamber of the associated cartridge. Similarly, each ultrafilter 50a, b or c has on its retentate outlet line 54a, b and c, respectively, an outlet control valve 56a, b, c, etc. By means of inlet control valves 52a, b, c, etc. and outlet control valves 56a, b, c, etc. it is possible to control both the rate of flow of feed liquid through the feed chamber and the pressure of the feed liquid in the feed chamber. Retentate from outlet lines 54a, b, c, etc. passes through a collection line 58 and a control valve 60 back to coalescer 16, for example, via line 14. In the coalescer additional free oil is separated from the recycled retentate.

Under normal operating conditions, ultrafiltration membranes can get dirty and plugged. This is primarily not due to actual plugging of the pores of the membrane, but instead to a phenomenon known as concentration polarization. The oil molecules tend to form a gel layer over the surface of the ultrafiltration membrane which gradually decreases the permeate flow rate and eventually will stop it entirely. Therefore, whenever the filtration system is in operation, a membrane flushing mechanism will be employed.

Each outlet line 54a, b, c, etc. is also connected to a flush recycle line 62a, b, c, etc., each of which is provided with an automatic control valve 64a, b, c. Flush discharge lines 62a, b, c, are large diameter, low backpressure lines having diameters several times that of outlet lines 54a, b and c to enable cyclic flushing of the ultrafiltration membranes in a manner to be described hereinafter. The periodic flushing dislodges an oil passivating film which builds up on the surface of the ultrafiltration membrane. Flush discharge lines 62a, b, c, etc. also lead back to coalescer 16, so that flush liquid can be recycled.

At predetermined time intervals an electric actuated valve 64a, b, c, will open on the exit side of one of the filter cartridges 50a, b, c, in sequential order and remain open for from 3 to 30 seconds, preferably 5 to 10 seconds. This induces a turbulent flow across the surface of the ultrafiltration membrane and breaks up the oil molecule gel layer at the surface of the membrane. The flush discharge is recycled to the coalescer in addition to the normal recycle of retentate from each ultrafiltration cartridge. The time intervals and flush durations can be varied to meet the requirements of specific installations.

A pressure sensor 59a, b, c, etc. is provided in the feed chamber of each ultrafiltration cartridge to monitor the pressure. The measured pressure values are transmitted to the controller and may be used to control pump 38 and/or valves 52a, b, c; 56a, b, c or 64a, b, c, as described hereinafter.

Optional temperature sensors 61a, b, c also may be included in the ultrafiltration cartridges to monitor the temperature in the cartridges. The measured temperature values may be transmitted to the controller and used to control the pump and/or valves in order to prevent the temperature in the ultrafiltration cartridges from exceeding a desired maximum, e.g., 100° F. Similar thermal sensors may be provided in surge tanks 34 and/or 68 to prevent the temperature from exceeding a desired maximum, e.g., 125° F.

A wash circuit line 74 extends between collection line 58 and filter stage feed line 40. Washing solution for the filters is contained in a wash solution tank 76 on line 74. Suitable wash solutions are known in the art and are commercially available. For example, good results are achieved with aqueous solutions of an alkaline liquid detergent comprising dipropylene glycol monomethyl ether sold by Madison Chemical Company of Madison, Ind. under the trademark "UF Cleaner". Control valves 78 and 80 are also provided on line 74 to regulate the flow of liquid in to and out of wash circuit line 74. A separate cleaning program automatically runs the cleaning and disinfecting solution through the ultrafiltration unit at the end of operation or at periodic intervals during continuous operation. By closing valves 42 and 60, and opening valves 78 and 80, wash solution from tank 76 can be pumped by pump 38 through the filters 44 and 48 to clean the filters.

Permeate discharged from the ultrafiltration cartridges 50a, b and c is conveyed by a permeate collection line 66 to a second surge tank 68. A flow meter 70 is provided on permeate collection line 66 to enable the flow of permeate from the ultrafiltration unit to be monitored. Surge tank 68 compensates for irregularities and the flow of permeate from ultrafiltration unit 48 and provides a steady flow of liquid to the subsequent filtering stages. A level sensor 72 is provided in surge tank 68 to sense the level of liquid in the tank and to shut down the pump to the subsequent carbon filter if the liquid level falls below a minimum desired level.

A pump 82 conveys liquid from surge tank 68 through line 84 and valve 86 to an activated carbon filter unit 88. Activated carbon filtration involves adsorption, which is a selective transfer of one or more solutes from a liquid phase to the surface of the rigid carbon particles of the filter medium. At ordinary temperatures, adsorption is caused by intermolecular forces. The activated carbon filter 88 serves to remove any residual low molecular weight organic materials which remain in the permeate from the ultrafiltration unit 48. Adsorption with activated carbon decolorizes the aqueous stream by removing color-imparting dissolved organic compounds. The effectiveness of the carbon filtration is monitored by passing the filtrate from the carbon filter 88 via line 90 to a photometer 92.

Periodically, the carbon filter is washed and reclassified by closing valves 86 and 98 and opening valve 102 to backwash carbon filter 88 with water from a water source 104 through line 106. A backwash recirculation line 108 extends between line 84 and line 66 and is provided with a control valve 110 so that backwash water from carbon filter 88 may be conveyed to surge tank 68.

The filtrate from the carbon filter 88 is pumped by pump 94 through line 96 and valve 98 to an ion exchange column 100, which is filled with a cation exchange resin that binds heavy metal ions, such as zinc, copper, manganese, nickel, lead, iron, cadmium, chromium, etc., and replaces them with hydrogen ions. Suitable resins are known in the art. For example, one particularly suitable resin containing chelating iminodiacetate functions is commercially available from Rohm & Haas Co. of Philadelphia, Pa., under the trade designation "Amberlite IRC-718".

Periodically, the ion exchange resin in column 100 can be regenerated by closing valves 98 and 112 and opening valves 118 and 120 to permit a regeneration solution from tank 122 to pass through lines 124 and 96 to ion exchange column 100, where it elutes the heavy metal ions from the ion exchange resin. The eluate from the column is discharged through line 126 to a precipitation treatment where heavy metals are precipitated in a sludge by adjusting the pH in a known manner.

Treated water from ion exchange column 100 passes through valve 112 and line 114 to a pH adjusting tank 116. Alkali from a tank 128 is added through line 130 and valve 132 as needed to adjust the pH to safe levels for disposal. A mixing device 134 is provided to assure thorough mixing of the liquid in the tank. The treated liquid is then discharged through line 136. A pH meter 138 on discharge line 138 continuously monitors the pH of the discharged liquid. The volume of treated liquid discharged through line 36 is also monitored by means of a flow meter 140.

Flow meters 46, 70 and 140, liquid level sensors 36, 72, and 142, photometer 92, pH meter 138 and pressure sensors 59a, b, c, etc. are all connected to a controller 144 so that the values measured by the respective sensors or measuring devices can be transmitted to the controller. For simplicity of illustration, these connections are indicated by interrupted broken lines. All of the valves in the system are remote control valves and are understood to be connected to controller 144 as are pumps 22, 38, 82 and 94. The controller is designed to operate the system automatically and to keep track of the amounts of water processed. The various sensing devices, which monitor liquid level, temperature, pressure, flow rates, pH, etc., transmit the results of their respective measurements to the controller which then automatically adjusts the various pumps and/or valves to maintain the operation of the system within desired parameters. Controller 144 may be a conventional sequencer which actuates the various valves and/or pumps in accordance with a predetermined time sequence or in response to a specified stimulus. For example, if level sensor 36 indicates that the liquid level in surge tank 34 has fallen below a desired minimum level, then controller 144 will shut down or slow pump 38 to prevent the pump from running dry. Similarly, if photometer 92 detects absorption bands indicating that organic compounds have broken through carbon filter 88, then pump 82 will be shut down and valves 86 and 98 closed to permit replacement of the filter media in carbon filter 88. For more sophisticated control, controller 144 may be a programmed digital computer.

A particular feature of the invention is that controller 144 may adjust the settings of inlet valves 52a, b, c, etc. and outlet control valves 56a, b, c, etc. in response to flow values measured by flow meter 70 in order to maintain a desired flow of permeate through ultrafiltration discharge line 66 as described in further detail hereinafter.

The operation of the system is as follows. Bilge water contaminated with oil is introduced through line 2 into gravity separator 4, where it passes around baffles 18 and 20 and separates into a lighter free oil fraction and a heavier contaminated water fraction. The free oil fraction flows over the top of baffle 6 into oil collection chamber 8 from whence it is conveyed through line 10 to oil recovery stage 12. The oil-contaminated water fraction is discharged from separator tank 5 through line 14 and pumped by pump 22 through filter 24 to remove entrained solids which might otherwise interfere with the subsequent treatment stages.

The filtered water fraction then passes through line 14 to coalescer 16, where dispersed free oil separates from the water fraction. Free oil collects in collection boot 28 and is withdrawn through line 30 to the oil recovery system 12. The aqueous phase leaving coalescer 16 through line 32 contains less than 1% of the free oil originally present in the bilge water plus emulsified oil and is conveyed to surge tank 34. If desired, the contaminated water from surge tank 34 may optionally be treated in clarifier 33 to remove excess solids.

The partially treated water from surge tank 34 is pumped by pump 38 through line 40 to micron filter 44 which removes any remaining minute solids that could interfere with subsequent ultrafiltration. Good results have been achieved using a 10 μ cartridge filter as micron filter 44.

The water then passes through flow meter 46 and valves 52a, b, c, etc. to ultrafiltration cartridges 50a, b, c, etc. Initially the inlet valves 52a, b, c are only partially open, and the outlet control valves 56a, b, c are fully open. The inlet valves are opened just enough to provide sufficient pressure in the feed chamber of the filtration cartridges to produce a desired flow of permeate as measured by flow meter 70. As the ultrafiltration process proceeds, a stratified layer of larger molecules starts to form over the ultrafiltration membranes. This layer slows the rate at which water molecules permeate through the membrane. When flow meter 70 detects a decreased rate of permeate flow, valves 52a, b, c are gradually opened to increase the pressure and maintain the permeate flow rate. This continues until the inlet valves 52a, b, c are fully open. The controller thereafter responds to decreases in the flow rate measured by flow meter 70 by progressively closing outlet control valves 56a, b, c to further increase the pressure in the retentate chambers of the ultrafiltration cartridges. When the outlet valves reach a predetermined minimum open setting or after a desired predetermined period of time, flush valves 64a, b, c are suddenly opened to divert the retentate from the retentate chamber through flush discharge lines 62a, b, c. Due to the low flow resistance of flush discharge lines, there is a sudden turbulent flow of retentate through the feed chamber across the surfaces of the ultrafiltration membranes which sweeps the stratified layer of oil molecules away from the membranes. After a desired flushing interval of from 3 to 30 seconds, preferably 5 to 10 seconds, inlet valves 52a, b, c are closed to their minimum open settings; outlet valves 56a, b, c are fully opened and flush valves described above.

In actual practice it is desired to repeatedly flush the ultrafiltration cartridges sequentially at desired intervals ranging from 30 seconds to 20 minutes. Thus, for example, in an ultrafiltration unit made up of six parallel ultrafiltration cartridges, the cartridges can each be flushed in turn at 1 minute intervals, so that each cartridge would be flushed every 6 minutes. Each individual flushing operation may last from as little as 3 seconds to as long as a minute or more. In test devices, good results have been achieved by flushing each ultrafiltration cartridge for 5 seconds at one minute intervals or for 10 seconds at 6 minute intervals.

The temperature and pressure and the ultrafiltration system are continuously monitored, and the system is shut down if the pressure exceeds 100 psi or the temperature exceeds 125° F.

The pressure in the feed chambers is monitored by pressure sensors 59a, b, c to assure that the ultrafiltration membranes are not ruptured by excessive pressure. When the pressure detected by the sensors reaches a desired maximum value, the pumping rate of pump 38 may be decreased to prevent the maximum from being exceeded. Alternately, appropriate adjustments could be made in the settings of the inlet valves 52a, b, c and/or outlet control valves 56a, b, c, or a flushing operation could be initiated by opening flush valves 64a, b, c. The valve settings and pump rate are controlled to maintain a retentate to permeate flow ratio in the range from 3:1 to 20:1, preferably in the range of 7:1 to 12:1, and particularly preferably in the range from 9:1 to 10:1.

The temperature in the ultrafiltration unit may be monitored by a temperature sensor 61a, b, c in the retentate chamber of each cartridge, or the temperature may be monitored by means of a temperature sensor in the permeate discharge line 66 or the permeate surge tank 68. If the detected temperature value transmitted to the controller starts to exceed the predetermined maximum limit, then the controller will shut the system down to prevent overheating.

The final oily wastewater treatment stages involve the removal of lower molecular weight organic compounds by activated carbon filtration and soluble hazardous heavy metal ions by cation exchange.

The permeate from the ultrafilter still contains short chain hydrocarbons. The invention treats the permeate by activated carbon filtration to remove these low molecular weight organic materials and reduce the overall biochemical oxygen demand of the waste stream. Permeate freed from emulsified oil passes through discharge line 66 to surge tank 68 from where it is withdrawn by pump 82 and pumped through line 84 to activated carbon filter 88. In the activated carbon filter, low molecular weight organic compounds such as ethanol, benzene, and the like are absorbed from the water. The filtered water is then discharged through line 90 and passes through photometer 92 which checks the water to see if any organic compounds have broken through the carbon filter. Depending on use, the activated carbon filter material in filter 88 must be replaced at periodic intervals or if breakthrough is detected. Suitable recharge intervals range from 2 to 12 weeks, preferably from about 6 to 10 weeks.

The interval between replacements of the activated carbon filter medium may be increased by periodically backwashing the carbon filter with water. This is done by closing valves 86 and 98 and opening valves 102 and 110 so that water from water source 104 can flow through lines 106 and 90 and thence back through the carbon filter. Backwash water from the filter passes through lines 84, 108 and 66 to surge tank 68. The backwash of the carbon filter reclassifies the filter medium and prevents channelization. Preferably, the activated carbon filter is automatically backwashed after each running cycle.

After activated carbon filtration, the waste water stream will appear virtually clear. The effectiveness of the coalescing, ultrafiltration and activated carbon filtration stages is monitored by photometer 92.

Heavy metal ions such as zinc, copper, nickel, iron, cadmium and chromium may still be present in the wastewater stream. These are removed by means of a cation exchange column containing a cation exchange resin. Ion exchange is a chemical process that allows the reversible exchange of ions between a liquid phase and a solid phase. It makes use of a solid resin which contains bound functional groups which carry an ionic charge (either plus or minus) accompanied by displaceable ions of opposite charge (counterions). In the present invention, the resin contains functional groups with negative charges, and positively charged hydrogen ions are used as the displaceable counterions. Water which has passed through the carbon filter is then pumped by pump 94 through line 96 to ion exchange column 100. As the wastewater stream containing hazardous heavy metals passes through the column 100, it contacts a cationic exchange resin bed which adsorbs the heavy metal ions which ionically attach to the resin. The heavy metal ions replace hydrogen ions which are displaced from the resin.

As the capacity of the resin approaches exhaustion, it is necessary to regenerate the cation exchange column. When heavy metal ions have displaced the majority of the hydrogen ions, the resin must be regenerated with a regeneration solution containing excess hydrogen ions. During regeneration, the heavy metal ions are eluted from the resin, and they are subsequently precipitated by raising the pH of the eluate. The regenerated resin is then ready for reuse to capture further heavy metal ions. The resin is regenerated with a regeneration solution which releases the captured heavy metal ions into a solution. This is done by closing valves 98 and 112 and opening valves 118 and 120 to admit regeneration solution from tank 122 through lines 124 and 96 to the ion exchange column, where it elutes the heavy metal ions from the resin. The regeneration solution is discharged from the column through line 26 to a precipitation stage where the heavy metal ions can be precipitated from the solution as a sludge by adjusting the pH. The sludge can be disposed of in conventional fashion. After regeneration, valves 118 and 120 are closed and valves 98 and 112 reopened to resume normal operation. The regenerated ion exchange resin can then be reused.

As the treated wastewater leaves the ion exchange column, it is virtually free of oil, organic compounds and heavy metals, but may still be too acidic for direct discharge into surface waters. The ion exchange treatment tends to render the water too acidic for safe discharge into streams or lakes. For this reason, the invention includes a final pH adjustment step to adjust the wastewater stream to a substantially neutral pH before discharge. The water is subjected to a pH adjustment step in an adjusting tank 116. Alkali from an alkali supply tank 128 is introduced to the water through line 130 and valve 132 and thoroughly mixed by mixing device 134 to achieve a substantially neutral pH. For safe discharge, the water should have a pH in the range from 6 to 9. To avoid excess consumption of alkali, it is preferred to adjust the pH to a value of approximately 6.

The pH of water discharged from adjusting tank 116 through line 136 is monitored by pH meter 138, and the addition of alkali is controlled in response to the measured pH value to assure proper neutralization. The volume of treated water discharged is monitored by flow meter 140.

At the end of operation, or periodically during operation, it is desirable to wash the ultrafiltration membranes. This is done by closing valves 42 and 60 and opening valves 78 and 80 to allow pump 38 to circulate a wash solution from tank 76 through the micron filter 44 and the ultrafiltration unit 48. A preferred washing solution is sold by Madison Chemical Co. of Madison, Ind., under the tradename "UF Cleaner". After a suitable period of washing, valves 78 and 80 are closed and valves 42 and 60 reopened to resume normal operation.

The oil content of the initial feed may range from 97% to 0.5%. The method of apparatus of the invention are particularly well suited for treating oily wastewater containing from 50% to 1% oil. The treated water discharged from the process typically contains less than about 0.001% oil.

Further details of the invention will appear from a consideration of the following example.

EXAMPLE

Bilge water from a river towboat containing approximately 25% oil was introduced into an apparatus which corresponded to that depicted in FIG. 1 except that the optional gravity separation and clarifier stages were omitted. Five thousand gallons of the water were filtered to remove coarse solids and then introduced into a horizontal coalescing unit having a coalescing chamber 3 feet in diameter and 9 feet long with a collection boot 2 feet in diameter at the top. The temperature in the tank was maintained at less than 150° F. and the pressure at less than 100 psig. Free oil was withdrawn from the top of the coalescer, and oil-contaminated water was withdrawn from the bottom and conveyed through a 10 micron bag filter to a seven cartridge ultrafiltration unit. Each cartridge membrane comprised 350 square feet of filtration area. The pressure in the filtration cartridges was maintained at less than 110 psig and the temperature at less than 110° F. Water was fed to the ultrafiltration unit at a rate of 80-100 gallons per minute, and the permeate flow was maintained at about 10 gallons per minute by appropriate adjustments of the inlet valves and outlet control valves. Each ultrafiltration cartridge was flushed in turn for 10 seconds every 6 minutes.

Retentate from the ultrafiltration unit was recycled to the coalescer. The permeate from the ultrafiltration unit was conveyed to an activated carbon filter and filtered to remove residual low molecular weight organic materials. The carbon filter contained 15 cubic feet of activated carbon. The filtrate from the activated carbon filter was then subjected to cation exchange in an ion exchange column containing 2 cubic feet of Rohm & Haas "Amberlite IRC-718" specialty ion exchange resin. After ion exchange, alkali was added with intensive stirring to adjust the pH of the treated water to pH 6. The treated water was then analyzed and found to contain less than 10 ppm oil.

The foregoing description and example have been set forth merely to illustrate the invention and are not intended to be limiting. Since modifications of the described embodiments incorporating the spirit and substance of the invention may occur to persons skilled in the art, the invention should be broadly construed to embrace everything falling within the ambit of the appended claims and equivalents.

What is claimed is:

1. A method of treating oily wastewater comprising the steps of passing oily wastewater through a coalescer to coalesce dispersed oil droplets; separating a free oil fraction as a liquid stream having a lower specific gravity from a contaminated water stream having a higher specific gravity; filtering particulate material from said contaminated water stream; passing the filtered water stream under pressure across an ultrafiltration membrane to separate a retentate fraction enriched in residual emulsified oil from an aqueous permeate fraction; recycling said substantially only retentate fraction to said coalescer; filtering said aqueous permeate through an activated carbon filter to remove low molecular weight organic materials; subjecting the filtrate from said activated carbon filter to cation exchange to remove heavy metal ions; and periodically flushing said ultrafilter with filtrate from said particulate filter to maintain the permeability of said ultrafiltration membrane.

2. A method according to claim 1, further comprising adjusting the pH of the water after the cation exchange step to a pH in the range from 6 to 9.

3. A method according to claim 2, wherein said pH adjustment is effected by controlled addition of sodium hydroxide.

4. A method according to claim 1, wherein said oily wastewater is initially passed through a gravity separator to separate a free oil portion therefrom before passage through said coalescer.

5. A method according to claim 1, further comprising filtering said oily wastewater before passage through said coalescer.

6. A method according to claim 1, wherein said oily wastewater is bilge water from a ship or boat.

7. A method according to claim 1, further comprising periodically backwashing said activated carbon filter.

8. A method according to claim 1, wherein said particulate filtration step is carried out using a 10 micron filter.

9. A method according to claim 1, further comprising periodically regenerating said ion exchange resin.

10. A method according to claim wherein inlet control valves are provided to control admission of feed to said ultrafiltration step, further comprising monitoring the rate of flow of permeate from said ultrafiltration step and automatically adjusting said inlet control valves in response to changes in the measured permeate flow to maintain a desired permeate flow rate.

11. A method according to claim 1, wherein said flushing of said ultrafilter is effected by periodically opening automatic valves connecting the retentate outlet of said ultrafilter to a low-pressure bypass line to induce turbulent flow across the ultrafiltration membranes.

12. A method according to claim 1, wherein said ultrafilter is flushed for periods of from 3 to 30 seconds at intervals of from 30 seconds to 20 minutes.

13. A method according to claim 12, wherein said ultrafilter is flushed for periods of from 3 to 15 seconds at intervals of 3 to 10 minutes.

14. A method according to claim 1, further comprising periodically circulating a cleaning solution through said ultrafilter.

15. A method according to claim 1, further comprising monitoring the rate of flow of feed solution to said ultrafilter and the rate of flow of permeate from said ultrafilter and adjusting the feed rate to maintain a retentate/permeate flow ratio in the range from 3:1 to 20:1.

16. A method according to claim 15, wherein the retentate/permeate flow ratio is maintained in the range from 7:1 to 12:1.

17. A method according to claim 16, wherein said retentate/permeate flow ratio is maintained in the range from 9:1 to 10:1.

18. A method according to claim 1, wherein said filtered heavy stream is passed across said ultrafiltration membrane under turbulent flow conditions.

19. A method according to claim 1, further comprising photometrically monitoring the filtrate from said activated carbon filtration step to confirm removal of organic contaminants.

20. A method according to claim 1, wherein said ultrafiltration step is carried out using a plurality of spirally-wound ultrafiltration cartridges connected in parallel.

21. A method according to claim 1, further comprising measuring the oil content in said oily wastewater before passage through said coalescer, and diverting said oily wastewater directly to an oil recovery system when the measured oil content is above a predetermined value.

22. A method according to claim 21, wherein said oily wastewater is diverted when the oil content is greater than 97%.

23. An apparatus for treating oily wastewater comprising means for feeding wastewater; a coalescer for separating a free oil fraction as a light stream from a contaminated water heavy stream; an oil fraction discharge means communicating with an upper portion of said coalescer, a solids filter; an ultrafiltration unit; means for conveying said contaminated water heavy fraction from said coalescer through said solids filter to said ultrafiltration unit; a retentate line leading from said ultrafiltration unit back to said coalescer, an activated carbon filter, a permeate line leading from a permeate chamber of said ultrafilter for transferring substantially all permeate to said carbon filter, a cation exchanger, a supply line leading from an outlet of said carbon filter to said ion exchanger, pump means for conveying oily wastewater through said apparatus, a flush discharge line connected to the retentate chamber of said ultrafilter, flush valves for controlling admission of retentate from said retentate chamber of said ultrafilter to said flush discharge line, and a controller for periodically opening said flush valves.

24. An apparatus according to claim 23, further comprising a gravity separator interposed between said feed means and said coalescer.

25. An apparatus according to claim 23, further comprising means for monitoring the flow rate of permeate flowing from said ultrafilter, a plurality of valves for controlling the admission of feed liquid to said ultrafilter, and means responsive to said monitoring means for adjusting said valves to maintain a desired permeate flow rate.

26. An apparatus according to claim 23, wherein said ultrafiltration unit comprises a plurality of spirally-wound ultrafiltration cartridges connected in parallel.

27. An apparatus according to claim 23, further comprising means for sensing the pressure of feed solution in said ultrafiltration solution, and means responsive to said pressure measuring means for preventing the pressure from exceeding a specified maximum value.

28. An apparatus according to claim 23, further comprising means for monitoring the temperature of feed solution in said ultrafiltration unit and means responsive to said temperature monitoring means for preventing the temperature from exceeding a predetermined maximum value.

29. An apparatus according to claim 23, further comprising means for backwashing said activated carbon filter.

30. An apparatus according to claim 29, wherein said backwashing means comprise a water source connectable to the outlet of said activated carbon filter and a return line communicating between the inlet of said activated carbon filter and a surge tank for storing solution to be filtered in said activated carbon filter.

31. An apparatus according to claim 23, further comprising means for regenerating said ion exchanger comprising a source of regenerating solution and means for conveying regeneration solution from said source through said ion exchanger.

32. An apparatus according to claim 23, further comprising a flow meter in said permeate line for measuring the flow of permeate through said line, and wherein said controller is a digital computer programmed to open said flush valves for a predetermined period of time whenever the permeate flow rate falls below a predetermined level.

33. An apparatus according to claim 23, further comprising means for measuring the oil content in said oily wastewater, and means for diverting said oily wastewater directly to an oil recovery system when the measured oil content is above a predetermined value.

34. An apparatus according to claim 33, wherein said oily wastewater is diverted when the oil content is greater than 97%.

35. An apparatus for treating oily wastewater comprising means for feeding wastewater; a coalescer for separating a free oil fraction as a light stream from a contaminated water heavy stream; an oil fraction discharge means communicating with an upper portion of said coalescer, a solids filter; an ultrafiltration unit; means for conveying said contaminated water heavy fraction from said coalescer through said solids filter to said ultrafiltration unit; control valve means for controlling the flow of said contaminated water fraction through said ultrafiltration unit; a retentate line leading from a retentate chamber of said ultrafiltration unit back to said coalescer; an activated carbon filter; a permeate line leading from a permeate chamber of said ultrafiltration unit for transferring substantially all permeate to said carbon filter; a cation exchanger; a supply line leading from said carbon filter to said ion exchanger; pump means for conveying oily wastewater through said apparatus; a flow meter for measuring the flow of permeate through said permeate line, and a controller operatively connected to said control valve means and responsive to said flow meter for regulating the flow of contaminated wastewater to said ultrafiltration unit to maintain a desired flow rate of permeate through said permeate line.

36. An apparatus according to claim 35, further comprising a flush discharge line connected to the retentate chamber of said ultrafiltration unit, valve means for controlling access of retentate from said retentate chamber of said ultrafiltration unit to said flush discharge line, and wherein said controller periodically opens said flush valves to flush said ultrafiltration unit.

* * * * *